United States Patent [19]

Patterson

[11] Patent Number: 5,350,451
[45] Date of Patent: Sep. 27, 1994

[54] BUILDING MATERIAL MADE FROM WASTE PAPER AND METHOD FOR PRODUCING THE SAME

[76] Inventor: Eric W. Patterson, 2115 Memory Lane Rd., Silver City, N. Mex. 88061

[21] Appl. No.: 925,730

[22] Filed: Aug. 10, 1992

Related U.S. Application Data

[63] Continuation-in-part of Ser. No. 726,945, Jul. 8, 1991, abandoned.

[51] Int. Cl.⁵ .................... C04B 16/02; C04B 18/24; C08L 1/00
[52] U.S. Cl. .................. 106/805; 106/163.1; 106/203; 106/204; 106/730; 106/731; 106/823; 428/537.7; 428/703; 428/375; 428/378; 428/379; 428/404
[58] Field of Search ............... 106/163.1, 805, 203, 106/204, 730, 731, 823; 428/537.7, 703, 375, 378, 379, 404

[56] References Cited

U.S. PATENT DOCUMENTS

| | | | |
|---|---|---|---|
| 1,268,929 | 6/1918 | Conniff | 52/376 |
| 1,604,097 | 2/1926 | Hewlett | 52/432 |
| 1,608,562 | 11/1926 | Melandri | 106/731 |
| 1,633,702 | 6/1927 | Hewlett et al. | 52/289 |
| 2,152,190 | 5/1936 | Henderson | 52/612 |
| 4,060,363 | 11/1977 | Nelson | 425/147 |
| 4,148,952 | 4/1979 | Nelson et al. | 428/2 |
| 4,369,054 | 1/1983 | Shinholster, Jr. et al. | 106/659 |
| 4,752,538 | 6/1988 | Bounini | 428/703 |
| 5,048,250 | 9/1991 | Elias | 52/659 |

FOREIGN PATENT DOCUMENTS

| | | | |
|---|---|---|---|
| 0034801 | 9/1981 | European Pat. Off. | 106/805 |
| 0127575 | 12/1984 | European Pat. Off. | 106/805 |
| 59-088350 | 5/1984 | Japan | 106/805 |
| 61-048487 | 3/1986 | Japan | 106/805 |
| 61-136950 | 6/1986 | Japan | 106/805 |
| 2042607 | 9/1980 | United Kingdom | 106/805 |
| 2137977 | 10/1984 | United Kingdom | 106/805 |
| 84/03275 | 8/1984 | World Int. Prop. O. | 106/805 |

*Primary Examiner*—Anthony Green
*Attorney, Agent, or Firm*—Cushman, Darby & Cushman

[57] ABSTRACT

A slurry composed of paper fibers, water, and cement that can then be used for a variety of construction applications is prepared. After draining the majority of the water, the slurry may be molded into blocks, sheets, or any other desired shape to be used as a construction material, or it can be sprayed onto wire shapes to form custom structures. The slurry product can be used as a mortar in conjunction with building blocks that have been made from the slurry, and it can be used as a plaster when mixed with conventional cement and sand mortar. The slurry can also be poured into forms in the same manner as concrete to form blocks for construction applications.

12 Claims, 2 Drawing Sheets

BUILDING MATERIAL MADE FROM WASTE PAPER AND METHOD FOR PRODUCING THE SAME

This is a continuation-in-part of Ser. No. 07/726,945, filed on Jul. 8, 1991, which is now abandoned.

BACKGROUND OF THE INVENTION

1. Field of the Invention

The present invention relates to materials used in the construction of buildings and other sheets, and custom forms as well as semi-liquid materials such as mortars and plasters.

2. Description of the Related Art

With over 50% of the average landfill mass comprised of paper, and with the growing need to decrease landfill input for obvious reasons, the ability to turn this paper into usable, stable, strong building products is a great advantage.

Many attempts dating back to the early 1900's have been made to develop structural building materials using discarded paper products. While these inventions used discarded paper products or fibrous material, they all relied substantially on other materials to supply the structural strength.

An example of the use of reinforcement elements or strengthening materials in a structure made from fibrous material is U.S. Pat. No. 1,268,929 to Conniff, which uses a reinforcing metallic element to provide additional structural strength to a wood fiber/cement composite material.

U.S. Pat. No. 1,604,097 to Hewlett and U.S. Pat. No. 1,633,702 to Hewlett et al. describe a similar structure where a wall made from a fiber/plaster mixture is reinforced by reinforcing elements made of wire or beams formed by pouring cement into the wall.

U.S. Pat. No. 1,808,562 to Melandri discloses a building block in which a cubic foot of material contains ten pounds of lime, twenty pounds of cement and sixty pounds of fibrous material, thus creating an extremely dense and heavy building product.

U.S. Pat. No. 3,718,536 to Downs et al. combines shredded paper with glass fibers, both of which are compressed using heat and pressure to make a composite board. The heat is necessary to melt thermoplastic material present in the limited range of paper types used in the process so that the thermoplastic material bonds the shredded paper material together.

U.S. Pat. No. 4,060,363 to Nelson discloses a method in which shredded paper is processed under heat and pressure to form paper into blocks to save shipping expenses in recycling. The resultant blocks provide a compact unit for shipping; however, the blocks cannot support a significant load and are manifestly unsuitable for construction applications.

U.S. Pat. No. 4,148,952 to Nelson et al. discloses a similar process in which shredded paper is combined with a glue binder and processed under heat and pressure to form the blocks. Though the binder decreases the tendency of the compressed paper to break up, the glue does not permeate the individual fibers in the paper; rather, it causes the inherently weak individual shreds to adhere to each other; thus, the product will fail under any significant load and cannot be used as a building material.

SUMMARY OF THE INVENTION

It is an object of the present invention to provide an advantageous, long-term use for waste paper products.

It is another object of the present invention to provide a new and improved method of making building materials from discarded paper products.

It is a further object of the present invention to provide a use for waste paper products which may be performed with approximately 90% of available waste paper as compared to the 15% usable by conventional recycling processes.

It is yet another object of the present invention to provide a method of constructing building blocks which are lighter and more cost-effective than conventional earthen or cement building blocks, but which have a higher "R" insulating factor.

It is still a further object of the present invention to provide a building material which may be used as a mortar or plaster as well as a solid building material.

Other objects of the present invention will be appreciated from the detailed description of the invention set forth below.

The above objects of the present invention are achieved by using waste paper, which might otherwise be disposed of in landfills, to make a building material that can be formed into various shapes, including, but not limited to, blocks and sheets of various dimensions. The building material of the present invention can also be sprayed onto preformed wire shapes and can be used as a mortar for the blocks and other shapes created from the material; or it may be mixed with conventional sand mortar and used as a plaster.

The building material of the present invention is comprised of comminuted paper products blended in water to form a slurry. An additive, such as cement, is preferably blended with the paper in forming the slurry for stabilization and strengthening purposes. The building material is made by soaking discarded paper in water until it becomes fully saturated and softened. When fully saturated, the paper is fed into a blending machine full of water and reduced to a fibrous slurry or pulp. When fully reduced, the majority of the water is removed from the slurry, and the building material then pressed into a mold, sprayed onto a form or used as a plaster or mortar. Where cement or another stabilizing agent is used, it is blended with the saturated paper while the paper is being comminuted by the blending machine.

The building material of the present invention may also be made by comminuting discarded paper in a dry state. After comminution is complete, the resulting fibrous material is added to water to create the slurry or pulp. When fully saturated, it may be used as the slurry or pulp is used in the method described above. Of course, cement may again be added for stabilization and strengthening purposes.

The construction products formed with the building material of the present invention have a high insulating factor and are cost competitive with currently available building materials. With the present invention being made almost completely of paper products and a small amount of cement or other additives for stabilization, it is a marked improvement over any other building product made from discarded paper products.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which.

DETAILED DESCRIPTION OF THE PRESENTLY PREFERRED EXEMPLARY EMBODIMENTS

Figure 1:
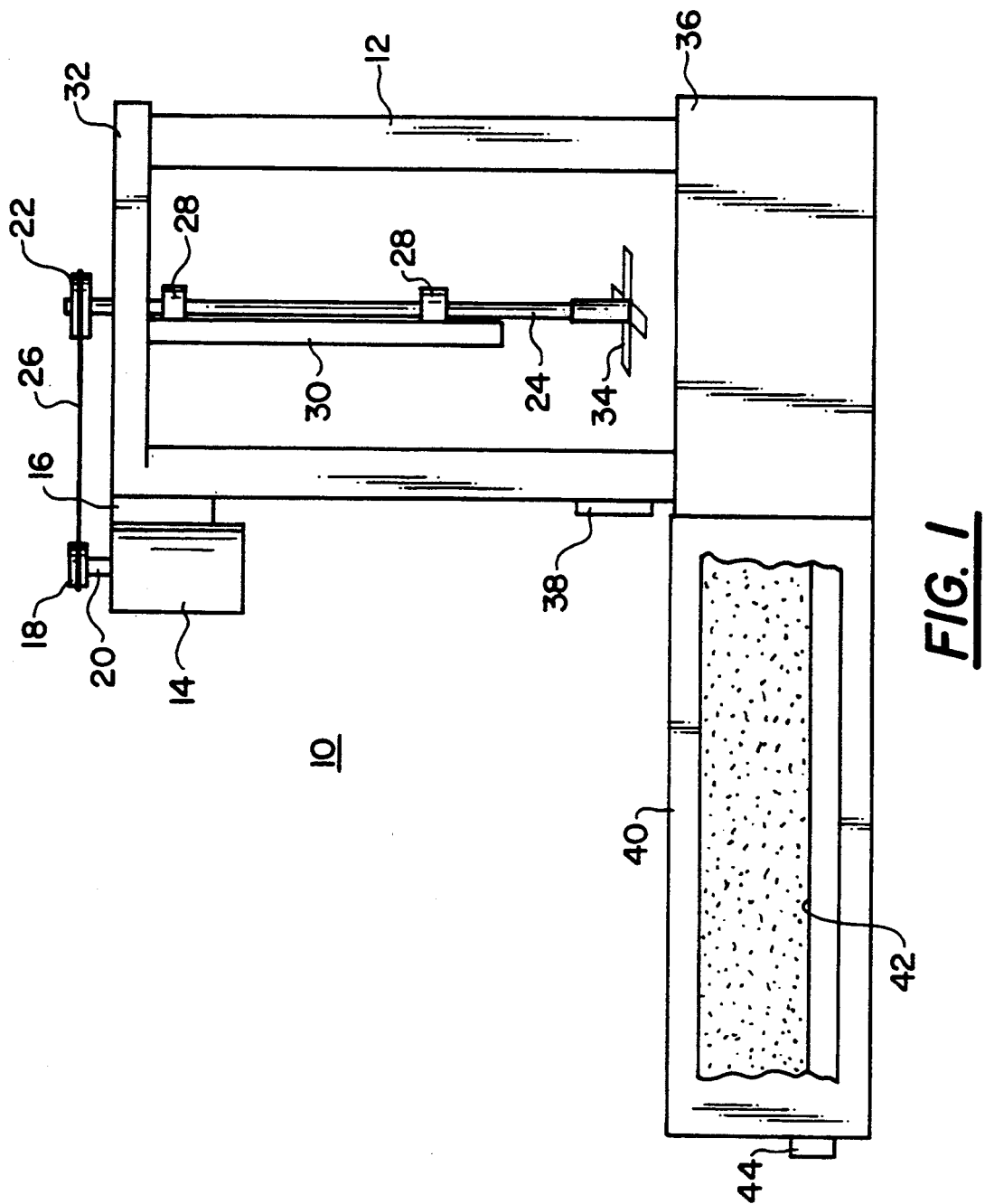
FIG. 1 is a cross-sectional view of a blending machine used to produce slurry for forming building products according to the present invention.

To create a slurry for use in the present invention, discarded paper is soaked in water until it becomes saturated and softens. The saturated paper is then fed into blending machine 10 which is full of water at the time the paper is added. Referring to FIG. 1, blending machine 10 comprises tank 12, which holds the aforementioned water. Drive motor 14 is mounted on the top portion of tank 10 by way of mounting bracket 16 and has motor pulley 18 mounted on motor drive shaft 20. Motor pulley 18 is mechanically coupled to blade pulley 22 mounted on blade shaft 24 by way of belt 26. Blade shaft 24 is held in place by bearings 28 mounted on bar 30, which is fixed to lid 32 of tank 12. Cutting blade assembly 34 is mounted on the end of blade shaft 24 opposite blade pulley 22.

Tank 10 may have any capacity suitable for producing a desired quantity of product; however, a cylindrical fifty gallon tank filled with thirty three gallons of water has been found to be advantageous for producing a manageable amount of slurry.

In operation, drive motor 14 causes cutting blade assembly 34 to spin. While cutting blade assembly 34 is spinning, saturated paper is fed into tank 12. The amount of saturated paper fed into blending machine 12 will of course depend on the size of the machine. For the above-described fifty-five gallon machine, approximately forty-four pounds of saturated paper are added.

Water at room temperature works well for this purpose; however, the water may be heated (even to its boiling point) to soften the paper faster.

Cutting blade assembly 34 comminutes the saturated paper to reduce it to its individual fibers, thus resulting in a fibrous pulp. A blade rotation speed of 3000 rpm has proven to be effective in this application; however, a higher blade speed may be used to shorten the time required to comminute the paper and to blend in cement as described below. A desired rotation speed may be achieved through an appropriate combination of drive motor and relative pulley diameters, or by some other means, as will be apparent to one skilled in the art.

While the saturated paper is being comminuted by the blending machine, eleven pounds of cement are added to the mixture. The rotating action of the machine uniformly coats the comminuted paper fibers with cement. Uniformly coating the fibers with cement serves to permeate and bind the fibers together; also, it provides additional structural strength to the final building product.

The tank assembly is positioned atop platform 36 so that dump valve 38 is located above slurry holding tank 40. After the paper, cement, and water have blended in the machine for a suitable amount of time so that the cement coats the individual paper fibers (preferably five to ten minutes), dump valve 38 is opened, thus causing the slurry to pour out into slurry holding tank 40 and onto screen 42. Screen 42 is preferably a ¼ wire mesh which holds the slurry but allows water to pass through. Thus, the slurry is collected on screen 42, where it may be dried and removed as described below.

As noted above, any size blending machine may be used; however, the amounts of paper, water and cement used in the process are preferably maintained in the ratio 4:3:1; i.e., four pounds paper and three gallon water for each pound of cement. This ratio may be varied somewhat depending on the application for which the slurry is ultimately to be used.

In the above-described embodiment, the waste paper is first saturated and then comminuted to form a slurry; however, this sequence of steps is not essential to practice the invention. The waste paper may be comminuted in a dry state and then combined with water to form a slurry. ALSO, it is not essential that cement be added to the slurry. A waste paper/water mixture may be used without the addition of cement; however, the resultant product has a decreased load-bearing capacity and a decreased moisture resistance.

Depending on the end use of the material, the slurry is left on screen 42 for twenty to ninety minutes. During this period, water from the slurry drains into holding tank 40 and is collected and removed from holding tank 40 via return outlet 44 and returned to blending machine 10 for use in processing another batch of paper. If the slurry is to be sprayed on to a form to produce a custom shape, it is drained for twenty minutes and then put into a device used to spray on texture coatings such as a Gunite sprayer. If the slurry is to be used as mortar, poured like concrete, or molded into blocks, it is most advantageous to drain it for sixty to ninety minutes to allow the cement to begin to set. This step produces more uniform blocks than those resulting from a shorter draining time.

To use the slurry as mortar, it is dumped on blocks previously made from the slurry and then manipulated by hand. If the slurry is mixed with conventional mortar for a plaster application, it is advantageously mixed with the mortar at a 1:1 ratio and then applied with a trowel.

Blocks may be formed by pressing the drained slurry material into forms. Metal forms may be used for this purpose; however, wooden forms work well and are less expensive. The blocks can be made to any dimension desired depending on construction requirements. The slurry is formed into blocks in the mold by using only enough hand pressure to ensure that the mold has been uniformly filled. A hand roller is then used to level off the top of the wet slurry in the mold and to scrape off any excess material. The mold is then removed and the resulting block or other shape is allowed to dry by evaporation. Sheets of the material are made in a similar fashion.

Figure 2:
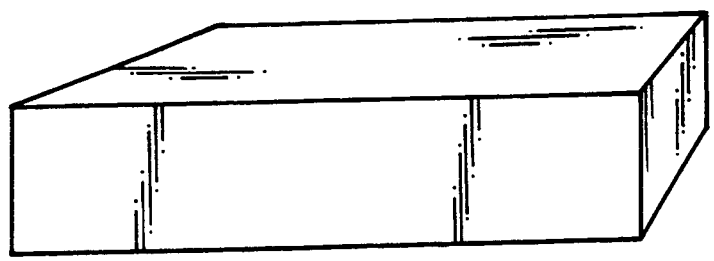
FIG. 2 is a perspective view of a block formed according to the present invention.
Figure 3:
FIG. 3 is a perspective view of a second block formed according to the present invention.
Figure 4:
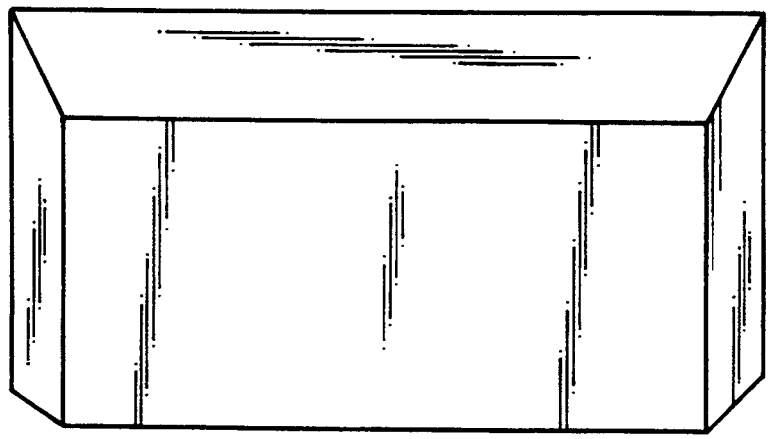
FIG. 4 is a perspective view of an angular "igloo" block formed according to the present invention.

The invention may be used in various shapes as a finished product, but for the purposes of this application, three types of blocks are shown. FIG. 2 is an "adobe" style block approximately 4" high × 12" wide × 16" long which weights approximately eight pounds. FIG. 3 is an expanded "adobe" style block approximately 4" high × 12" wide × 47" long which weights approximately 23 pounds. FIG. 4 is a an angular block for constructing an "igloo" style dome. Dimensions and angles for this block would change with the proposed radius of the dome.

Although several preferred embodiments of the invention have been shown and described, it will be appreciated by those skilled in the art that changes may be made in these embodiments without departing from the principles and the spirit of the invention, the scope of which is defined in the appended claims.

What is claimed is:

1. A building material comprising:
   water,
   communited paper products forming a plurality of paper particles and blended with water to form a slurry, said plurality of paper particles having a first weight, and
   cement blended with said water and said plurality of paper particles so as to substantially coat said plurality of paper particles, said cement having a second weight;
   wherein said first weight is about four times said second weight.

2. The building material of claim 1, wherein said slurry comprises one pound of said cement and three gallons of said water for each four pounds of said paper product.

3. The building material of claim 1, wherein said building material is a plaster comprised of said slurry and a mortar.

4. The building material of claim 3, wherein said plaster comprises by weight one part of said slurry and one part of said mortar.

5. The building material of claim 1, wherein said material further comprises:
   a custom-shaped form,
   wherein said slurry is disposed as a sprayed layer on said custom-shaped form.

6. The building material of claim 1, wherein said material is formed substantially in the shape of a block.

7. A building material comprising:
   water,
   communited paper products forming a plurality of paper particles blended with said water to form a slurry, and
   a stabilizing and strengthening material blended with said water to form a slurry and said plurality of paper particles so as to substantially coat said plurality of paper particles, and
   wherein said slurry comprises about one pound of said stabilizing and strengthening material and three gallons of said water for each four pounds of said paper products.

8. The building material of claim 7, wherein said stabilizing and strengthening material is cement.

9. The building material of claim 7, wherein said building material is a plaster comprised of said slurry and a mortar.

10. The building material of claim 9, wherein said plaster comprises by weight one part of said slurry and one part of said mortar.

11. The building material of claim 7, wherein said material further comprises:
    a custom-shaped form,
    wherein said slurry is disposed as a sprayed layer on said custom-shaped form.

12. The building material of claim 9, wherein said material is formed substantially in the shape of a block.

* * * * *

UNITED STATES PATENT AND TRADEMARK OFFICE
CERTIFICATE OF CORRECTION

PATENT NO. : 5,350,451
DATED : Sep. 27, 1994
INVENTOR(S) : Eric W. Patterson

It is certified that error appears in the above-indentified patent and that said Letters Patent is hereby corrected as shown below:

In column 4, line 24, "ALSO" should read -- Also --.

In Claim 1, at column 5, line 16, "communited" should read -- comminuted --.

In Claim 7, column 6, line 10, "communited" should read -- comminuted --.

Signed and Sealed this

Seventh Day of March, 1995

*Attest:*

BRUCE LEHMAN

*Attesting Officer*  *Commissioner of Patents and Trademarks*